United States Patent Office 3,114,671
Patented Dec. 17, 1963

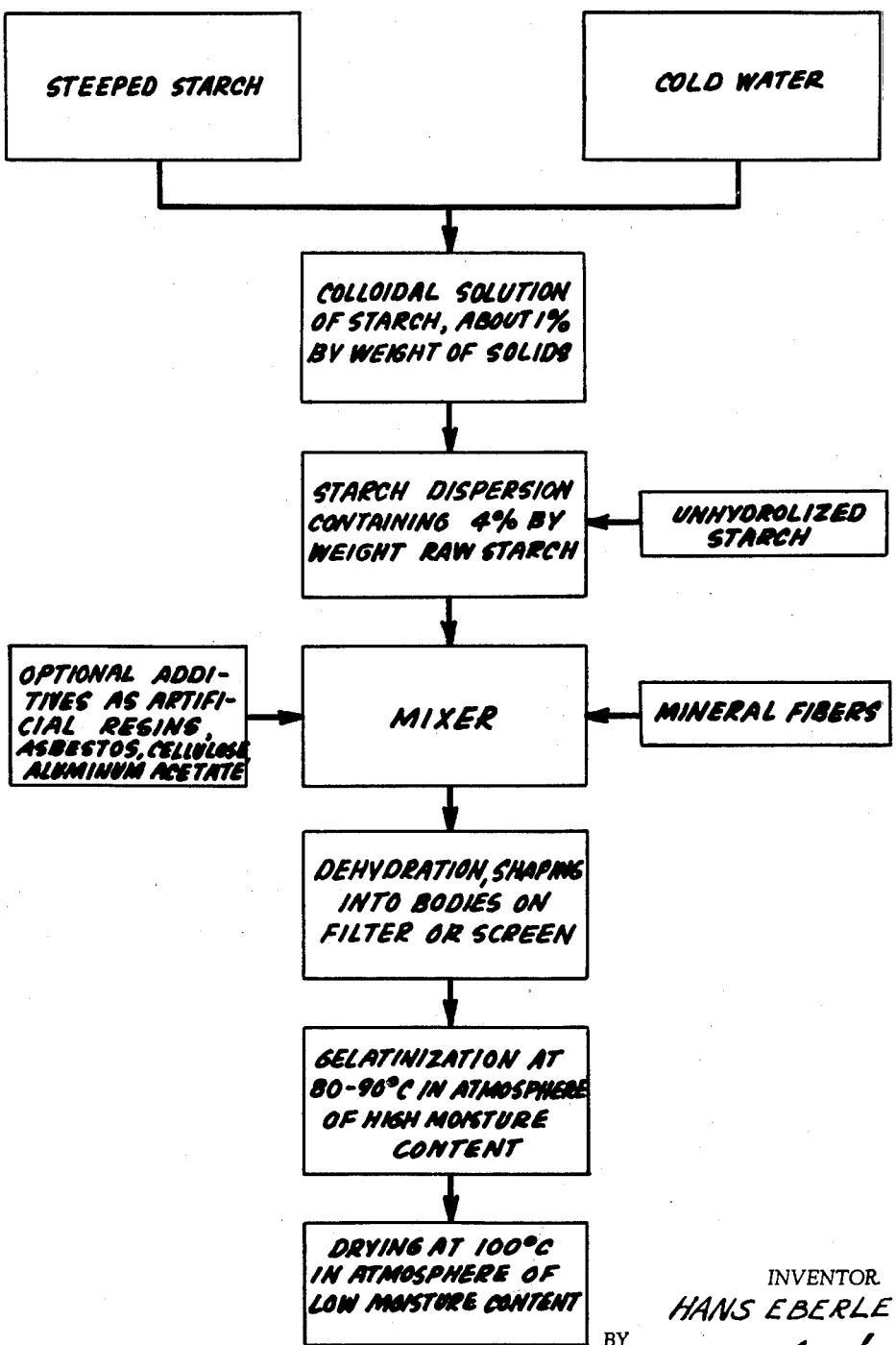

3,114,671
MANUFACTURE OF SHAPED MINERAL FIBER BODIES
Hans Eberle, Ludwigshafen (Rhine), Germany, assignor to Grunzweig & Hartmann A.G., Ludwigshafen (Rhine), Germany, a German company
Filed Mar. 17, 1960, Ser. No. 15,762
Claims priority, application Germany Mar. 19, 1959
3 Claims. (Cl. 162—155)

The present invention relates to the production of shaped or molded bodies from a suspension of mineral fibers and a binder.

It is known to make shaped bodies, such as for example, sheets from mineral fibers by saturating a fleece of mineral fiber in submerging it in aqueous solutions or dispersions of synthetic resins, removing the excess binding agent by suction and then drying the impregnated sheet. Suitable binders are highly polymerized thermoplastic polyethylene derivations such as, for example, polyvinyl acetate or polyacrylates, or again binders based on duroplasts such as, for example, phenol and carbamide resins, or bitumen emulsions, starch, and other natural or synthetic highly polymerized compounds having an adhesive character.

The sheets or other shaped bodies obtained in this way have generally a binding agent content of between 3 and 10 percent by weight and a specific weight between 0.06 and 0.15. Mineral fiber sheets with a high specific weight, namely from 0.2 upwards, are of particular interest for special purposes, for example, for insulation at higher temperatures, for reducing the sound of footsteps and for the use of shaped pieces of this kind as sound-absorbent sheets.

During the production of the mineral fiber fleeces by the jet or spray blowing method sheets of higher density are made in part by simultaneously bringing pulverulent binding agent, especially phenol resins, into the compartments, and by this process sheets with densities of 0.3 and more are obtained. This method has the disadvantage, however, that considerable quantities of binding agent (about the same quantity as is required to bind the fiber) are entrained by the air or steam blowing medium which leads to contamination of the plant and makes the process uneconomical. Again, arising from the dark color effect created by the binding agent, these sheets often cannot be used as sound-absorbent media until they have undergone a colored surface treatment.

In order to produce sheets of higher density and with a binder content of about 20%, the method using a mash is also followed. For this purpose, degraded starch or starch capable of swelling has proved especially suitable as a binder. The process is carried out by preparing an approximately 5% solution of starch in water and mechanically dispersing about 25 parts by weight of mineral fibers in this solution. The mass which is no longer filterable and pudding-like is put into molds and the water is evaporated at elevated temperature. Light-colored sheets with a density of 0.300 and a content of binder of 20 percent by weight are obtained. These sheets have a good absorptive action towards sound and good insulating properties against heat, and, since they have very good mechanical strength, may also be nailed. The process possesses the disadvantage, however, that it cannot be operated continuously, since, on account of the very high viscosity of even a 5% starch solution, the mass is no longer filterable and consequently the water cannot be removed by means of a rotary sifting machine or a Fourdrinier or again on a drum filter.

It has now been found that light-colored mineral-fiber shaped bodies, e.g. sheets of high density and with a high binding-agent content of 20% and over, may be continuously produced when the binding agent, e.g. starch, is suspended in water, not in dissolved or soaked form, but in the insoluble form, the mineral fibers are introduced into this suspension and homogeneous fiber sheets, which still possess a residual water content, are produced with this mixture of low viscosity by way of a drum suction filter, and in the subsequent drying process at raised temperature and in an atmosphere saturated with water vapor, the starch suspended in the residual water is first converted into the gelatinized form, and after the gelatinization of the starch, the residual water is evaporated at elevated temperature and an outer atmosphere not saturated with water-vapor. The mineral fiber structure thereby becomes firm or well bonded.

In the following the invention is explained more in detail with reference to the flow sheet which indicates the sequence of the order of steps.

By the process according to the invention it is possible to work without difficulty with very high concentrations of binding agent, since the unhydrolyzed starch suspended in water makes practically no difference to the viscosity of the liquid and the mixture remains easily filterable. This is of special importance when the shaped sheets or other bodies are produced in endless strips by means of drum filters sifting drums or Fourdiniers.

A 4% aqueous solution of hydrolyzed starch has a viscosity of about 1190 cp.; a 5% starch solution is already a pudding-like gel, the viscosity of which can no longer be measured in the Höppler viscosimeter. On the other hand, the apparent viscosity of an unhydrolyzed 4% suspension of starch in water is 1.8 cp. and a 5% suspension of starch 1.9 cp.

It has been found that, for the purpose of better disintegration of the felted mop of mineral fibers, it is advantageous to prepare an approximately 1% aqueous solution of low viscosity of hydrolyzed starch, in which 4% by weight of unhydrolyzed starch, referred to the liquid, is suspended, and then to disperse the mineral fibers homogeneously in this colloidal suspension by known mechanical devices.

Carbamide resin precondensates or, for example, also polyvinyl acetate dispersions or other polyethylene derivatives in dissolved, suspended or emulsified form may be added to the aqueous starch suspension. After the homogeneous dispersion of the mineral fibers, the other synthetic resins present in the water in dissolved or dispersed form besides the starch suspended in the water may be precipitated on the fibers by means of precipitants, if desired before the further processing of the suspension of mineral fibers into shaped bodies. In this connection it has proved advantageous also to use in the suspension of binding agent small amounts of natural or synthetic fibers of inorganic or organic nature, such as, for example, chrysotilasbestos or cellulose fibers which possess a high absorptive capacity.

In order to accelerate the gelatinization of the unhydrolyzed starch in the gelatinization process, substances such as, for example, aluminium acetate, can be mixed in dissolved form with the suspension. Furthermore, fillers or pigments and stabilizers may also be added to the aqueous mineral fiber-starch suspension.

The shaped bodies produced on the bottom of the filter which have a residual water content of about 150–400 percent by weight, referred to the mineral fibers, are then exposed for 15–20 minutes to a temperature below 100° C., preferably 80–90° C., in an atmosphere saturated with water vapor, for the purpose of gelatinizing the suspended starch also in the core of the body, and the residual water is then evaporated in an outside atmosphere not saturated with water vapor, thereby strengthening the bond between the fibers.

It will be appreciated that the process according to the

I claim:

1. Process for the production of soundproof and heat insulating shaped mineral fiber sheets or other bodies from a suspension of mineral fibers and starch in which the starch serves as a binder, said process comprising the steps of first preparing a colloidal low viscosity aqueous starch solution containing substantially 1% by weight of hydrolyzed starch, then suspending at least 4% by weight of unhydrolyzed starch in said solution without appreciably changing the viscosity and dispersing a predetermined amount of mineral fibers in the suspension thus formed, forming a moist shaped body from said suspension, subjecting said shaped body to a temperature below 100° C., preferably between 80 and 90° C., in an atmosphere saturated with water vapor to gelatinize the starch in said body, and evaporating the residual water at an elevated temperature in an atmosphere of low water content.

2. Process for the production of soundproof and heat insulating shaped mineral fiber sheets or other bodies from a suspension of mineral fibers and starch in which the starch serves as a binder, said process comprising the steps of first preparing a colloidal low viscosity aqueous starch solution containing substantially 1% by weight of hydrolyzed starch, then suspending at least 4% by weight of unhydrolyzed starch in said solution without appreciably changing the viscosity, adding polyvinyl acetate in dispersed condition to the solution and dispersing a predetermined amount of mineral fibers in the suspension thus formed, forming a moist shaped body from said suspension, subjecting said shaped body to a temperature below 100° C., preferably between 80 and 90° C., in an atmosphere saturated with water vapor to gelatinize the starch in said body, and evaporating the residual water at an elevated temperature in an atmosphere of low water content.

3. Process for the production of soundproof and heat insulating shaped mineral fiber sheets or other bodies from a suspension of mineral fibers and starch in which the starch serves as a binder, said process comprising the steps of first preparing a colloidal low viscosity aqueous starch solution containing substantially 1% by weight of hydrolyzed starch, then suspending at least 4% by weight of unhydrolyzed starch in said solution without appreciably changing the viscosity, adding polyvinyl acetate in dispersed condition to the solution, dispersing chrysotile asbestos as a substance having high absorptive capacity in said solution and dispersing a predetermined amount of mineral fibers in the suspension thus formed, forming a moist shaped body from said suspension, subjecting said shaped body to a temperature below 100° C., preferably between 80 and 90° C., in an atmosphere saturated with water vapor to gelatinize the starch in said body, and evaporating the residual water at an elevated temperature in an atmosphere of low water content.

References Cited in the file of this patent

UNITED STATES PATENTS

| | | |
|---|---|---|
| 1,972,493 | Powell | Sept. 4, 1934 |
| 2,103,318 | Clapp | Dec. 28, 1937 |
| 2,225,100 | Clapp | Dec. 17, 1940 |
| 2,773,763 | Scott | Dec. 11, 1956 |

FOREIGN PATENTS

| | | |
|---|---|---|
| 773,732 | Great Britain | May 1, 1957 |

OTHER REFERENCES

Casey: "Starches in Paper and Paperboard Manufacture," TAPPI Sec., February 19, 1942, "Paper Trade Journal," pp. 107–114, 116, 117. (Copy in 162–175.)